United States Patent [19]

Briggs et al.

[11] Patent Number: 5,404,756

[45] Date of Patent: Apr. 11, 1995

[54] METHOD OF MAKING A CAPACITIVE PRESSURE SENSOR

[75] Inventors: Paul F. Briggs, Wolcott; George H. Bucci, Tolland; Donald L. Drapeau, Meriden; Lawrence E. Egle, E. Hampton, all of Conn.

[73] Assignee: Walbro Corporation, Cass City, Mich.

[21] Appl. No.: 222,414

[22] Filed: Apr. 1, 1994

Related U.S. Application Data

[62] Division of Ser. No. 984,896, Dec. 2, 1992, Pat. No. 5,351,548.

[51] Int. Cl.6 ............................ G01L 9/12; H01G 7/00
[52] U.S. Cl. ........................................ 73/718; 29/25.41
[58] Field of Search ............................ 29/25.41, 25.42; 361/283.1, 283.3, 283.4; 73/119 A, 718, 724, 756, 398; 364/571

[56] References Cited

U.S. PATENT DOCUMENTS

| 3,698,249 | 10/1972 | Weaver | 73/398 |
| 3,880,008 | 4/1975 | Eilerson | 73/398 |
| 4,227,419 | 10/1980 | Park | 73/724 |
| 4,295,376 | 10/1981 | Bell | 73/724 |
| 4,507,973 | 4/1985 | Barr | 73/724 |
| 4,982,351 | 1/1991 | Kawate et al. | 364/571 |
| 5,025,667 | 6/1991 | Strasser | 73/724 |
| 5,090,246 | 2/1992 | Colla et al. | 73/718 |

Primary Examiner—Richard E. Chilcot, Jr.
Assistant Examiner—William L. Oen
Attorney, Agent, or Firm—Barnes, Kisselle, Raisch, Choate, Whittemore & Hulbert

[57] ABSTRACT

A method of making a capacitive pressure sensor preferably for a vehicle fuel system with a flexible diaphragm, spacer and rigid substrate disposed in opposed face-to-face relation in a housing and yieldably urged together by a spring clamp. Electrodes disposed on the immediately adjacent opposed faces of the diaphragm and substrate produce a signal indicative of and varying with changes in the pressure of fluid acting on the diaphragm to displace its central portion relative to the substrate. In operation, through sensor and control circuitry, the speed of a fuel pump is varied to vary and control the pressure of fuel supplied to an engine in response to varying engine operating loads and conditions. To control the flow of fuel, a check valve, pressure relief valve and vent valve may be provided in the housing.

7 Claims, 3 Drawing Sheets

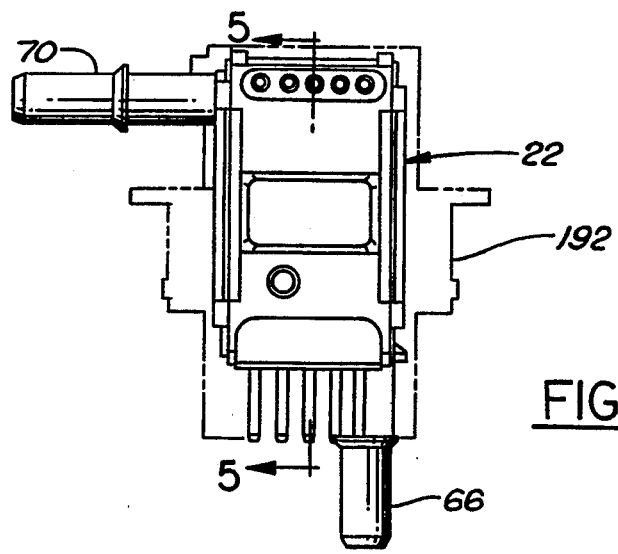
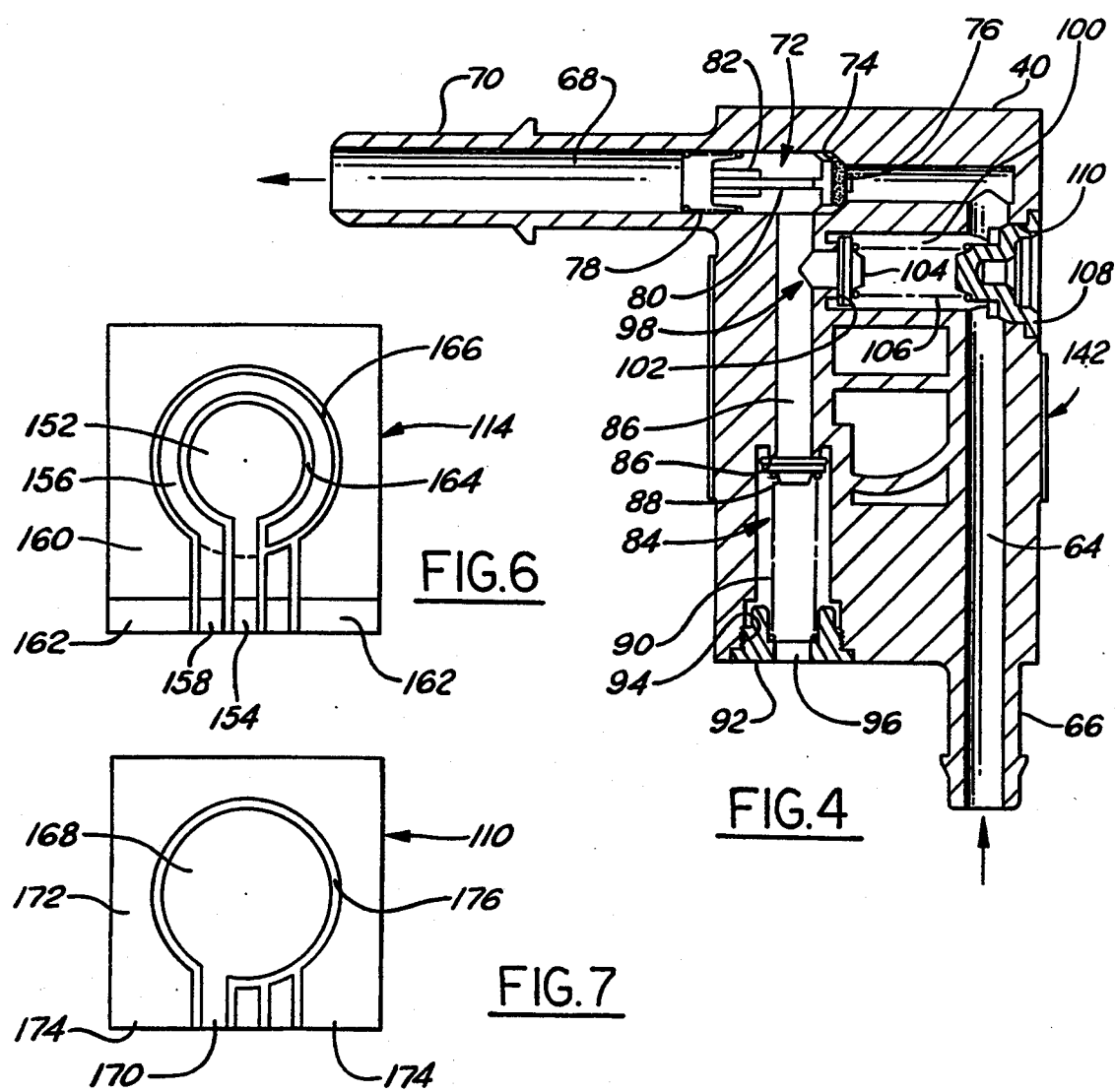

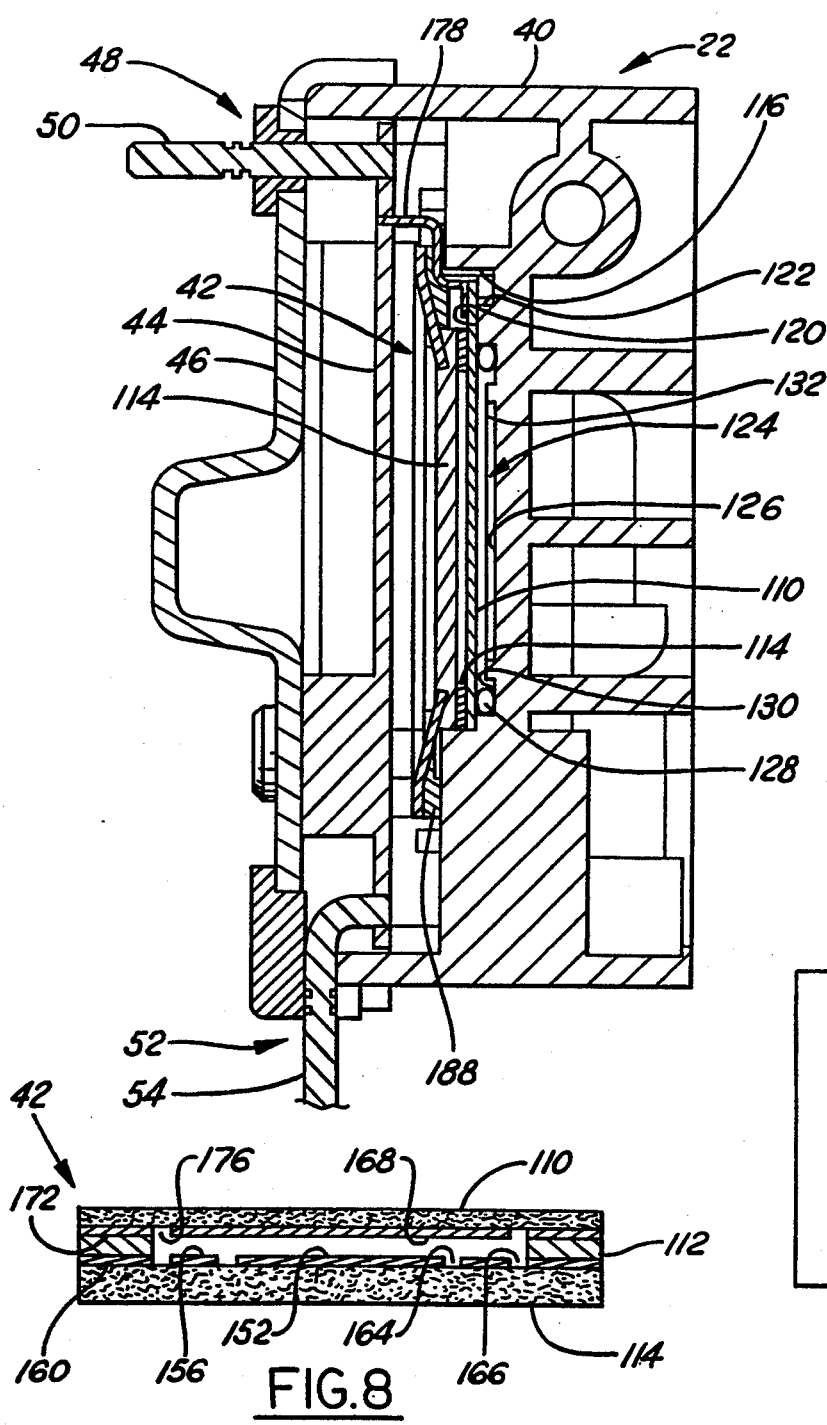
FIG.5
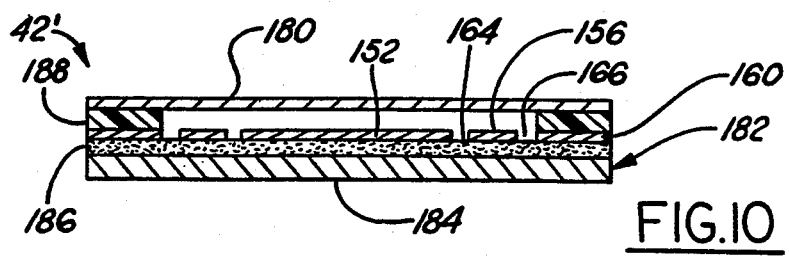
FIG.8
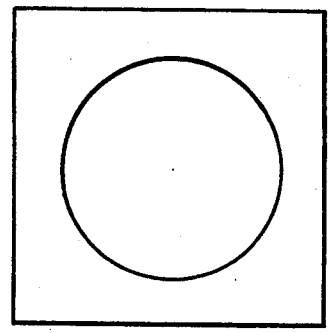
FIG.9
FIG.10

METHOD OF MAKING A CAPACITIVE PRESSURE SENSOR

This is a divisional of application Ser. No. 07/984,896, filed on Dec. 2, 1992, and issued on Oct. 4, 1994, as U.S. Pat. No. 5,351,548.

FIELD

This invention relates to pressure transducers and more particularly to a capacitive pressure sensor and method of making it.

BACKGROUND OF THE INVENTION

Pressure sensors with spaced apart capacitive electrodes are previously known. U.S. Pat. No. 4,227,419 discloses a capacitive pressure sensor with a pair of spaced apart ceramic plates with opposed flat faces on which electrodes are disposed. At least one of the ceramic plates is sufficiently flexible to provide a diaphragm which flexes with variations in pressure applied thereto to change the capacitance of the capacitor formed by the electrodes. Suitable electronic circuitry utilizes the change in capacitance to produce an output signal indicative of the pressure applied to the diaphragm. The ceramic plates are secured and sealed together in spaced apart relationship adjacent their periphery by a glass frit disposed between them and fired to fuse them together. Usually, the sealed space between the ceramic plates is evacuated and frequently filled with a gaseous controlled atmosphere.

SUMMARY OF THE INVENTION

A capacitive sensor with flat and generally parallel electrodes received on a rigid substrate and a flexible diaphragm with a spacer disposed between them and yieldably urged together around their periphery. The diaphragm is sufficiently flexible to be displaced in response to variations in the pressure of fluid acting thereon to change the spacing between the electrodes to produce a signal indicative of the pressure of the fluid applied to the flexible diaphragm. Preferably, one of the diaphragm and substrate has only one electrode thereon, preferably in the form of a circular disk, and the other of the substrate and diaphragm has two electrodes thereon, preferably one in the form of a circular disk and the other an annular ring encircling the disk. Together these electrodes form first and second capacitors whose ratios of their respective capacitances vary as a function of and in response to variations in pressure applied to the flexible diaphragm.

To provide a pressure sensor for a vehicle fuel system, preferably the diaphragm and substrate with electrodes thereon are yieldably mounted by a spring in a housing which in cooperation with the diaphragm defines a chamber for applying fluid to the diaphragm without contacting the electrodes, spacer or substrate. Preferably, the housing also contains valves for relieving the outlet fuel pressure, retaining a minimum fuel pressure and venting the outlet fuel pressure.

Objects, features and advantages of this invention are to provide a capacitive pressure sensor in which the diaphragm, substrate, and electrodes may be yieldably mounted in operative relationship, readily accommodates variations in tolerances and the stackup of tolerances of its component parts, preloads the diaphragm and substrate assembly to disposed the electrodes in parallel spaced apart relationship, avoids contamination and deterioration of the electrodes, spacer and substrate by the fluid being sensed, is rugged, durable, produces a highly accurate and repeatable signal indicative of the fluid pressure being sensed, is of relative simple design and of economical manufacture and assembly, and has a long in-service useful life.

BRIEF DESCRIPTION OF THE DRAWINGS

These and other objects, features and advantages of this invention will be apparent in view of the following detailed description of the best mode, appended claims and accompanying drawings in which

FIG. 2 is a side view of the pressure sensor and manifold device embodying this invention encapsulated in a cover of the fuel module;

FIG. 4 is a sectional view of the device illustrating some of the fuel passages and valves thereof;

FIG. 5 is a sectional view taken generally on line 5—5 of FIG. 2 illustrating the pressure transducer of the device of FIG. 2;

FIG. 6 is a top view of a rigid substrate with one electrode thereon of the pressure transducer;

FIG. 7 is a top view of a flexible diaphragm with an electrode thereon of the pressure transducer;

FIG. 8 is a sectional view of the substrate of FIG. 6, diaphragm of FIG. 7, and a spacer in assembled relation;

FIG. 9 is a top view of a diaphragm and electrode of a modified pressure transducer; and FIG. 10 is a fragmentary sectional view of the diaphragm, spacer and substrate in assembled relationship of the modified pressure transducer.

DETAILED DESCRIPTION

Figure 1:
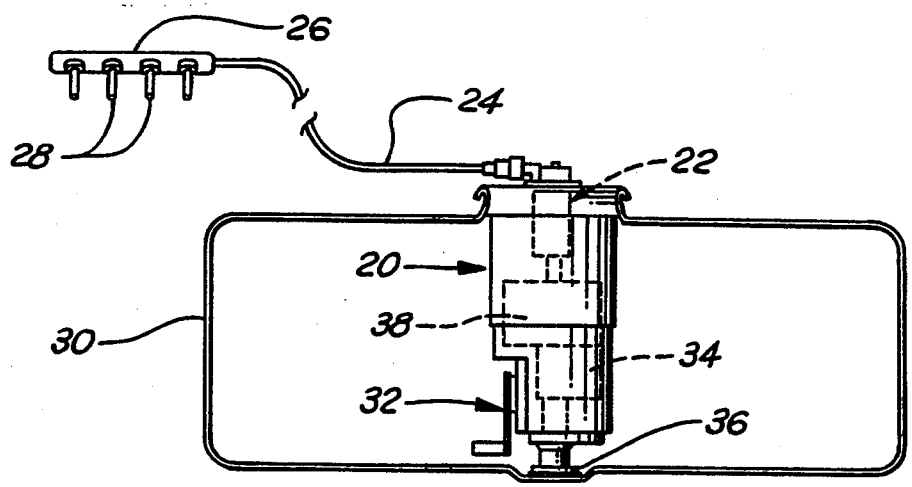
FIG. 1 is a schematic view of a vehicle fuel pump module with a pressure sensor and manifold device therein embodying this invention received in a fuel tank and connected to a fuel rail and injectors for an internal combustion engine of an automotive vehicle.

Referring in more detail to the drawings, FIG. 1 illustrates a fuel pump module 20 with a fuel pressure sensor and manifold device 22 embodying this invention connected by a fuel line 24 to a fuel rail 26 and fuel injectors 28 of an internal combustion engine (not shown), for a vehicle, such as an automobile. In use, the pump module is mounted in a fuel tank 30 and has a fuel level sensor 32 and a fuel pump 34 with an outlet connected to the manifold device and an inlet communicating with the bottom of the tank through a fuel filter 36. The pump is driven by an electric motor 38, the speed of which may be varied to control the pressure of fuel delivered by the pump to the engine. The fuel system does not have any fuel return line from the engine to the fuel tank and is often referred to as a no return system.

Figure 3:
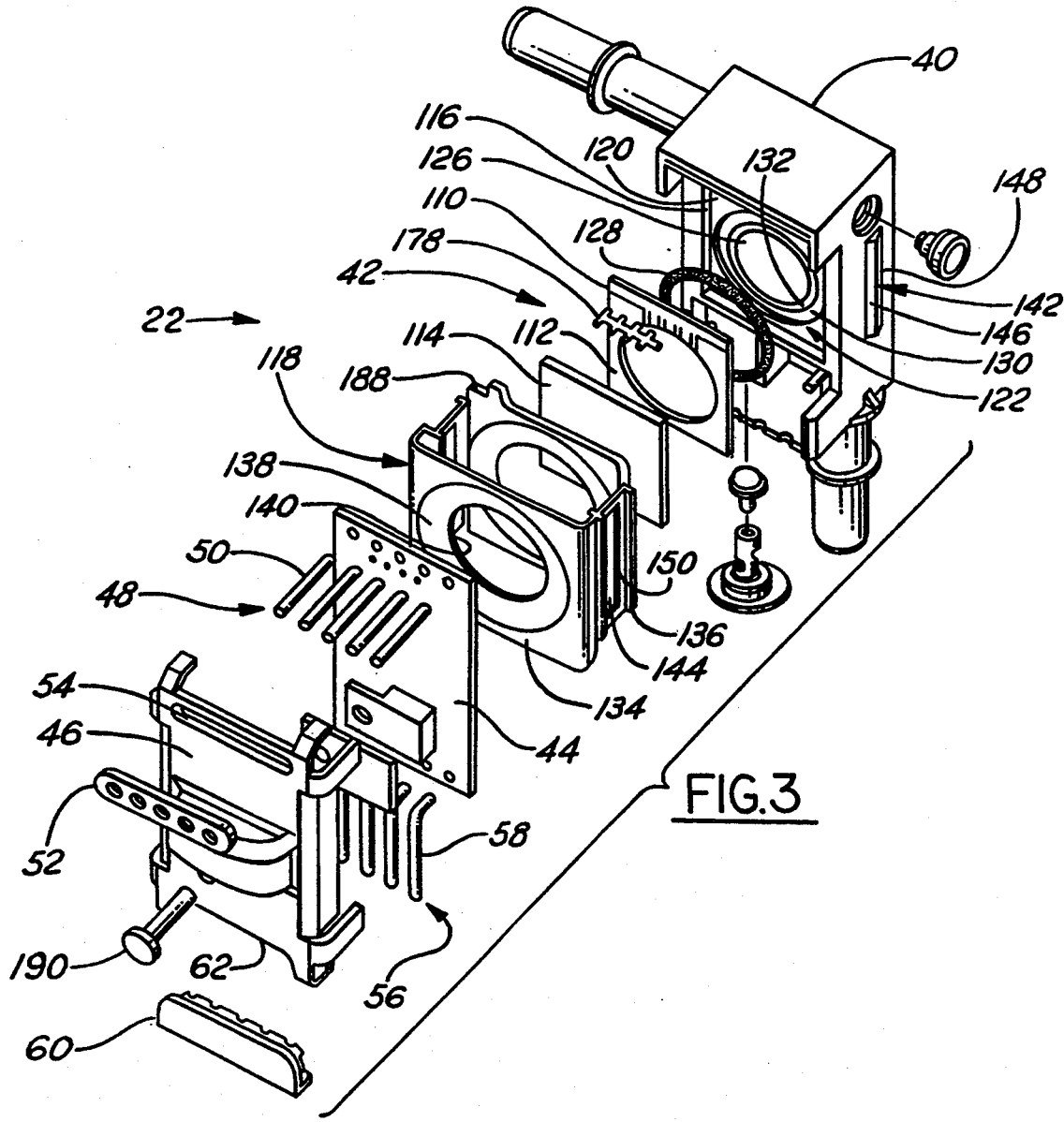
FIG. 3 is an exploded view of the component parts of the pressure sensor and manifold device of FIG. 2.

As shown in FIGS. 2 and 3, the sensor and manifold device 20 has a housing 40 preferably molded of a synthetic resin with a pressure transducer assembly 42 and a printed circuit board 44 therein enclosed by an outer cover 46. The circuit board has electronic circuits which vary and control the speed of the electric drive motor 38 and hence the output of the fuel pump 34 in response to signals from the fuel pressure transducer 42 and various signals from an engine control module which typically contains a central processing unit controlling operation of the engine. Electric signals and operating power are supplied to the circuit board through a connector assembly 48 with electrical contact pins 50 mounted on the board and a bushing 52 received in a slot 54 in the cover. Electric current is supplied to the pump motor and a signal is received from the level sensor through an electrical connector assembly 56 with contact pins 58 mounted on the board and a bushing 60 received in a recess 62 in the cover.

As shown in FIGS. 3 and 4, the housing has a fuel inlet passage 64 and connector 66 which in assembly is connected to the outlet of the fuel pump. The manifold also has a fuel outlet passage 68 communicating with the inlet passage and an outlet connector 70 which in assembly is connected to the fuel delivery line 24. When the engine and fuel pump are shut down, the pressure of the fuel in the outlet passage 68 and delivery line is maintained by a normally closed check valve assembly 72 which opens when the fuel pump is energized and supplies fuel to the outlet passage. The check valve assembly has a seat 74 which is preferably molded in the housing, a complementary valve 76 which is yieldably biased to its closed position by a spring 78 and has a stem 80 slidably received in a retainer body 82 which is preferably pressed with an interference fit into the outlet passage. The force produced by the spring 78 and the spring rate thereof are selected so that the valve 76 will open at a pressure well below the usual operating pressure (which is usually in the range of about 30 to 70 psig) such as 2–5 psig.

To protect the entire fuel system from over pressure, a normally closed relief valve assembly 84 is disposed in a passage 86 which communicates with the outlet passage downstream of its check valve 72 and with the fuel tank 30 by opening to the exterior of the housing 40. The relief valve assembly 84 has a seat 86 which is preferably molded in the housing 40 and a complementary valve 88 yieldably biased by a compression spring 90 to bear on the seat when the valve is closed. The other end of the spring is received in a counterbore in a retainer cap 92 received in a threaded counterbore 94 in the housing. To discharge fuel, the retainer cap has a central passage 96 through it. The force produced by the spring 90 and its spring rate are determined and selected so that the relief valve 88 is normally closed and will open at a predetermined pressure which is usually about 10 to 15 psi greater than the maximum normal operating pressure of the fuel system. The relief valve protects the fuel system in the event there is a malfunction which causes the pump to continuously operate at maximum pressure or during periods of so-called "hot soaking" (with the engine either running or shut down) in which the temperature of the fuel, and hence its pressure, increases above the desired maximum operating pressure due to heat absorbed by the fuel. In some vehicles, if there is a malfunction in the fuel system, the engine control module is programmed to cause the fuel pump to operate at maximum pressure so that the vehicle can "limp home" or be operated and driven to a service station for repair of the malfunction.

In some engines, the fuel pressure at the injectors is varied in response to engine manifold pressure to maintain a substantially constant differential pressure across the injectors. This results in a fuel line pressure and fuel pump pressure which varies relative to atmospheric pressure as engine load factors change. For example, from full throttle to idle conditions, the fuel line pressure may vary from 40 to 30 psig. When such engines rapidly go from full throttle to idle, it is desirable to immediately reduce the pressure of the fuel supplied to the engine to substantially the lowest normal fuel pressure (i.e. 30 psig) to avoid an overly rich fuel to air mixture. This may be accomplished by a bleed valve assembly 98 disposed in a passageway 100 communicating with the fuel outlet downstream from its check valve 72 and the fuel inlet preferably, but not necessarily, downstream of the pressure sensor. The bleed valve assembly has a seat 102 preferably molded in the housing and a complementary valve 104 yieldably biased to its closed position by a spring 106 received on a cap 108 press fit in a counterbore 110 in the housing. The valve 104 is normally closed and opens to bleed fuel in response to the fuel pressure produced by the pump dropping below the outlet fuel line pressure. Typically, when the engine is idling, the valve is opened to reduce the pressure of the fuel in the outlet to the low end of the normal range of fuel pressure under engine idle operating conditions. For example, if the fuel pressure during normal engine operation conditions is in the range of about 30 to 40 psig, the valve may open when the throttle is at idle to reduce the pressure to about 30 to 31 psig. This may be accomplished by the valve 104 and spring 106 being designed so that its spring force and rate permits the valve to open with a differential pressure of 30 psi. This bleed valve assembly 98 avoids parasitic losses when the engine is operating under load conditions by remaining closed so that there is no bleeding of fuel from the outlet passage.

As shown in FIG. 5, the pressure transducer assembly 42 has a flexible diaphragm 110, spacer 112 and a rigid substrate 114 received in a rectangular recess 116 in the housing and yieldably biased into assembled relationship by a spring strap or clip 118. The periphery of the diaphragm bears on an essentially planar surface 120 of a shoulder or seat 122 in the housing. In use, the central portion of the diaphragm is displaced by fuel under pressure received in a chamber 124 defined by the outer face of the diaphragm and preferably a circular recess 126 in the housing. The chamber continuously communicates with the fuel inlet passage 64 through a passage not shown. A fluid tight seal is provided by an O-ring 128 received in a recess 130 bearing on the diaphragm and compressed by the spring clip 118. To prevent damage to the diaphragm in the event it is subjected to subatmospheric fluid pressure in the chamber, its displacement is limited by bearing on the sidewall of the chamber which is disposed relatively close to the diaphragm in its relaxed state and an annular rib 132 therein adjacent the periphery of the active area of the diaphragm which further limits the maximum displacement of this area of the diaphragm away from the substrate.

As shown in FIG. 3, the spring strap 118 has a generally U-shape configuration with a central portion 134 and a pair of spaced apart legs 136. To yieldably urge together the transducer components, the central portion has a spring 138 in the form of a frusto-conical washer which is preferably integral with the central portion. In assembly, the peripheral edge 140 of the spring washer bears on the substrate 114 and overlies or is generally aligned with the seat 122 on which the diaphragm bears. In assembly, the spring strap is retained by elongate detents 142 on opposed sides of the housing which project into slots 144 in the legs of the strap. Preferably, each detent has a ramp 146 along its leading edge which cams a spring leg over its associated detent and a relatively sharp trailing edge or shoulder 148 over which the leading edge of the slot of its associated leg snaps to secure the strap to the housing. Preferably, the spring washer 138 applies a force of at least 100 pounds to the substrate to clamp together the substrate, spacer and diaphragm adjacent their periphery and to force the diaphragm into firm engagement with the seat 122 in the housing.

As shown in FIGS. 6–8, the capacitive sensor has electrodes received on the opposed inner faces of the diaphragm and substrate. As shown in FIGS. 6 and 8, the rigid substrate 114 has adhered to its inner face, both a central electrode 152, preferably in the form of a disk, with a connector pad 154, and an outer electrode 156, preferably in the form of a ring which encircles the central electrode, with a connector pad 158. Preferably, a guard ring 160, encircling the annular electrode, with connector pads 162 is also adhered to the substrate. The electrodes are isolated from each other and the guard ring by annular spaces or gaps 164 and 166.

As shown in FIGS. 7 & 8, the diaphragm 110 has an electrode 168, preferably in the form of a circular disk, with a connector pad 170 received on and adhered to the inner face of the diaphragm. Preferably the electrode 168 is encircled by an annular guard ring 172 with connector pads 174 also received on and adhered to the inner face. To electrically isolate the electrode and guard ring there is an annular space or gap 176 between them. Preferably, the surface area of the central electrode 152 is substantially equal to the surface area of the annular electrode 156, and the diaphragm electrode 168 has substantially the same diameter as the outside diameter of the annular electrode 156. Preferably, the spacer 112 between the diaphragm and substrate can also be a layer of material disposed over and adhered to either of the guard rings, such as the guard ring 160 on the rigid substrate.

Preferably, the diaphragm and substrate are of a ceramic material. Preferably, the electrodes, pads and guard rings are relatively thin layers of an electrically conductive metal, such as silver, gold or platinum, and may be deposited as a thick film ink by a silk screen process. Typically, the thick film ink is a mixture of metal and glass frit particles in a carrier vehicle. The deposited ink film is then fired on the substrate and diaphragm and cooled to produce electrically conductive metallic layers on the ceramic substrate and diaphragm. A relatively inexpensive rigid ceramic substrate with an inherent camber on its inner face may be utilized by depositing a metal layer thereon of sufficient thickness so that its exposed face can be lapped to achieve necessary flatness or an essentially planar surface. Typically, the lapped outer face of electrodes 152, 156 and ring 160 of the rigid ceramic substrate 114 is planar within about plus or minus 0.0002 of an inch per lineal inch even though the inner face of the substrate has a camber of about plus or minus 0.001 of an inch per lineal inch. After lapping to produce essentially flat electrodes, additional layers of metal or a polymer material, such as polyamide, can be deposited over the guard ring 160 to produce a spacer 112 of the desired thickness. If the spacer is formed from metal it can be applied by the same thick ink, silk screening and firing process used to form the electrodes.

Typically, for a transducer capable of sensing a pressure differential in the range of 0 to 75 psia, a relatively thin ceramic diaphragm with a thickness of about 0.020 of an inch, and a relatively thick and rigid ceramic substrate with a thickness of at least about 0.080 of an inch is satisfactory. The metal layers of the electrodes and guard rings typically have a nominal thickness of about 0.002 of an inch. The spacing between the electrodes of the diaphragm and substrate (and hence the thickness of spacer 112) is usually in the range of about 0.0005 to 0.020 of an inch and often less than about 0.010 of an inch and for electrodes having an active diaphragm surface area of less than one square inch usually less than 0.0025 of an inch, and preferably about 0.0015 of an inch.

The electrodes 152, 156 & 168 of the transducer assembly are electrically connected in the sensor circuit of the printed circuit board by electrically conductive contacts 178 each connected to a pad 154, 158 or 170 of one of the electrodes. To isolate the signal produced by the electrodes from stray electromagnetic interference, preferably both of the guard rings 160 & 172 are electrically grounded through one of the contacts 178 and their pads 162 & 174.

A sensor assembly 42' with a modified flexible diaphragm 180 and substrate 182 is illustrated in FIGS. 9 and 10. The diaphragm 180 is a flexible and resilient thin plate of a conductive metal, such as stainless steel, copper or the like. Because the diaphragm itself is electrically conductive, it also serves as an electrode and hence no separate metal layer is deposited thereon. In assembly, the diaphragm 180 functions in essentially the same way as the diaphragm 110 and electrode 168 of the transducer assembly 42. The substrate 182 has a rigid base plate 184 of steel with a layer of fired porcelain enamel 186 thereon on which the electrodes and guard ring are received. The diaphragm is spaced from the substrate by a spacer 188 received between them. To electrically isolate the conductive diaphragm from the guard ring 160 of the substrate, the spacer 188 is made of a non-conductive synthetic resinous material, such as a polyamid. If desired, the spacer may be molded on and adhered to either the diaphragm or the substrate. In assembly, this transducer 42' functions in substantially the same manner as the transducer 42.

In assembling the device 20, the valve assemblies 72, 84 & 98 are first assembled and installed in the housing 40. A transducer 42 or 42' is sub-assembled by connecting the electric contacts 178 such as by soldering to the pads 154, 158, 162, 170 & 174 of the electrodes and guard rings and disposing the substrate 114 or 182, spacer 112 or 184 and diaphragm 110 or 180 in opposed face-to-face relationship. The O-ring 128 is disposed in the recess 130 in the chamfer and the transducer sub-assembly 42 or 42' is disposed in the recess 116 of the housing. To retain them in the housing, the spring strap 118 along with a seal 188 are placed over the substrate and the legs 136 of the spring strap are snapped over the detents 142 on the housing. The bellville or conical spring washer 138 of the strap yieldably urges the substrate, spacer and diaphragm together about their periphery and the diaphragm into sealing engagement with the O-ring 128 and firm engagement with the planar surface 120 of the seat 122. This results in a cantiliver mounting of the diaphragm about its periphery so that only the active central portion of the diaphragm will be deflected by the action of pressurized fluid in the chamber 124. This spring mounting of the pressure transducer also compensates for the manufacturing tolerances of the spring strap, substrate, spacer, diaphragm and axial location of the seat surface 128 relative to the retainer edges 148 of the detents 142 on the housing.

The posts 50 & 58 of the electrical connectors 48 & 56 are sub-assembled and electrically connected to the printed circuit board 44 which is then disposed in the housing 40, electrically connected to the sensor contacts 178 and secured therein such as by heat staking. The cover 46 is assembled over the housing and secured in place by a fastener 190 and the connector bushings 52 & 60 are placed over the posts 50 & 58 and received in the slot 54 and recess 62 in the housing. Preferably, the device 20 is then encased or potted by injection molding around it a cover 192 (FIG. 2) of the pump module of a synthetic resinous material, such as acetal. Preferably, the cover 192 totally encloses and hermetically seals the device 20. During molding, the seal 188 prevents any molten resin from entering the pressure transducer 42 or 42' and the fluid chamber 124.

The device may be relatively small. In one practical embodiment, the housing is about 1" deep, 1¼" wide and 1½" high, excluding the inlet and outlet conduits projecting beyond the housing, and the diaphragm, spacer and substrate are about 0.8×0.9 of an inch.

In use, the pressure of the fuel in the inlet 64 and hence the pressure of the fuel supplied by the pump is sensed by the capacitive transducer 42 or 42' which produces a signal indicative of and varying with changes in the fuel pressure. The transducer signal is processed and used by circuitry in the printed circuit 44 board along with signals from an engine control module to vary the speed of the electric motor 38 driving the fuel pump 34 and hence the pressure of fuel supplied through the device to the engine in response to the load on the engine and other engine operating conditions. Under certain engine operating conditions, when the pressure is momentarily too high of the fuel supplied to the engine, such as rapidly going from full load to idle conditions, the pressure vent valve 98 opens to reduce to a predetermined value the pressure of the fuel supplied to the engine. Under operating conditions, if there is a malfunction in the fuel system which results in fuel being supplied to the engine at an excessively high pressure, such as a malfunction of the engine control module, the pressure relief valve 84 opens to dump excess fuel into the fuel tank. This insures that in spite of the malfunction, fuel will continue to be supplied to the engine (without damaging the fuel system) so that the vehicle can be driven to a service station for correction of the malfunction. Also, under so-called hot soak conditions, the fuel may be heated sufficiently to produce excessive pressure which would be relieved by opening of the pressure relief valve 84 to dump fuel into the gas tank. These hot soak conditions may occur either when the engine is operating, such as when idling for a long period of time in hot weather, or when the engine is shut down, such as by fuel absorbing heat from the hot engine injectors and fuel rail. Under operating conditions, the fuel retention valve 72 is open and when the engine is turned off it closes to retain fuel in the outlet 68 and the engine fuel system under normal operating pressure for the next starting of the engine.

We claim:

1. A method of making a pressure sensor comprising, providing a housing having therein an annular seat with an essentially planar surface which is at least substantially continuous circumferentially, disposing on said seat a flexible diaphragm having a face with an essentially flat electrode thereon when the diaphragm is unflexed, disposing a rigid substrate in said housing with an essentially flat electrode thereon overlying and in spaced apart generally opposed relationship to the electrode of the diaphragm, disposing a spacer between said substrate and said diaphragm adjacent the periphery of said diaphragm, and extending substantially continuously circumferentially around the periphery of the diaphragm and constructed and arranged to space apart said electrodes in substantially parallel opposed relation when the diaphragm is unflexed, and disposing a clamp on said housing with a spring yieldably biasing the substrate, spacer and diaphragm together adjacent the periphery of the diaphragm and the diaphragm onto the essentially planar surface of the seat, whereby the electrodes are disposed in operative relationship in the housing to produce a signal indicative of and varying with changes in the pressure of a fluid acting on the diaphragm to displace the diaphragm relative to the substrate.

2. The method of claim 1 wherein the diaphragm is a relatively flat plate of a non-conductive material and said electrode on the diaphragm is at least one layer of a conductive material disposed on and adhered to the inner face of the diaphragm.

3. The method of claim 1 wherein the diaphragm and at least one of the electrodes thereon is a relatively thin and generally flat plate of a homogenously integral and electrically conductive material.

4. The method of claim 1 wherein the diaphragm and at least one of the electrodes thereon is a relatively thin and generally flat plate of stainless steel.

5. The method of claim 1 wherein the substrate has a generally flat face of a non-conductive material, at least one of the electrodes on the substrate comprises at least one layer of electrically conductive material disposed on the generally flat face of the non-conductive material, and at least the active portion of the exposed face of the electrode is lapped to an essentially planar active surface of such electrode.

6. The method of claim 5 which also comprises forming the spacer as a layer of material disposed on and adhered to only one of the diaphragm or the substrate and having an exposed face which is essentially planar and constructed and arranged to operably bear on the other of the substrate or diaphragm.

7. The method of claim 1 which also comprises forming the spacer as a layer of material disposed on and adhered to only one of the diaphragm or the substrate and having an exposed face which is essentially planar and constructed and arranged to operably bear on the other of the substrate or diaphragm.

* * * * *